M. B. HARVEY.
Hay Tedder.
No. 107,365. Patented Sept. 13, 1870.
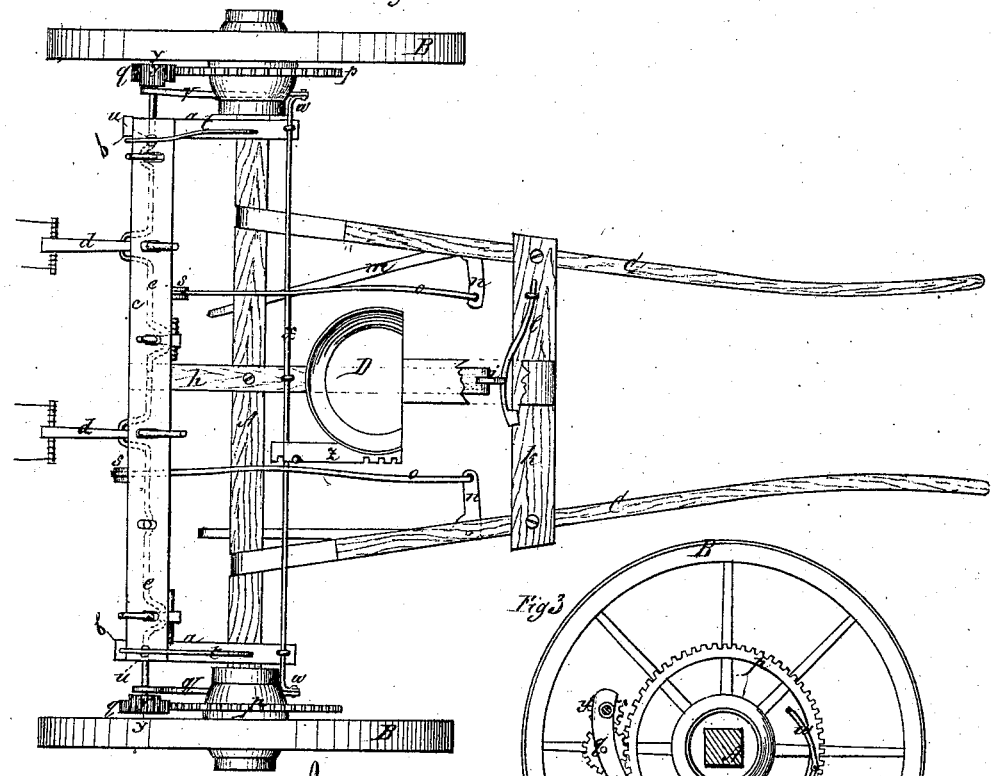
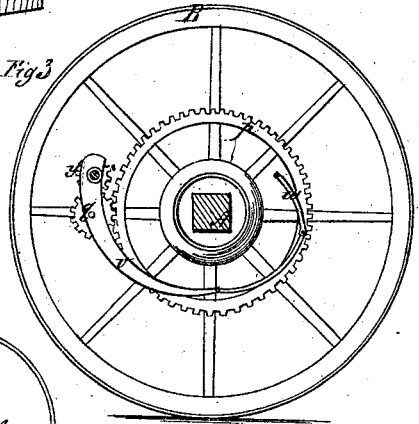
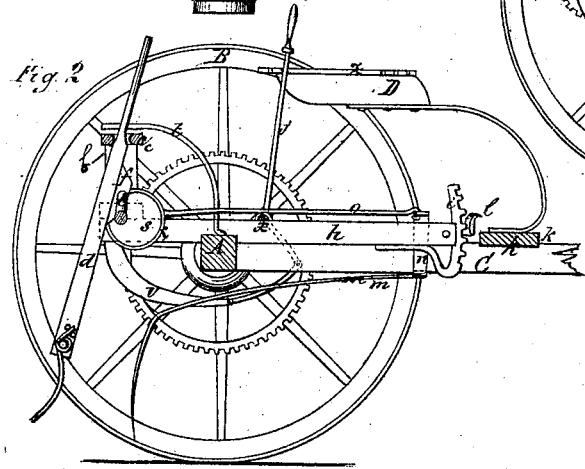
Witnesses. Moses B Harvey, Inventor.

United States Patent Office.

MOSES B. HARVEY, OF STAFFORD, CONNECTICUT, ASSIGNOR TO HIMSELF AND HARRISON F. COOK, OF SAME PLACE.

Letters Patent No. 107,365, dated September 13, 1870.

IMPROVEMENT IN HAY-TEDDERS.

The Schedule referred to in these Letters Patent and making part of the same

*To all whom it may concern:*

Be it known that I, MOSES B. HARVEY, of Stafford, in the county of Tolland and State of Connecticut, have invented a new and improved Machine for Spreading and Turning Hay; and I do hereby declare the following to be a full, clear, and exact description of the same, reference being had to the accompanying drawing making a part of this specification, in which—

Figure 1 is a plan view;

Figure 2, a sectional elevation; and

Figure 3, a side elevation of one of the transporting-wheels, with the master-wheel attached, and with the apparatus for throwing the fork crank-shaft in and out of gear.

This invention relates to a mechanism designed to follow a mowing-machine, or a man-mower, for the purpose of spreading the hay left by the latter lying in swaths on the ground; and, also, to turn hay that has been lying in masses and is partially dried, so as to expose fresh surfaces to the sun.

The invention consists in sway-bars, that receive lateral motion from a horizontal crank-shaft, and begin the spreading operation by throwing the grass alternately to one side and the other.

Also, in a device operative from the driver's seat, for keeping the forks that complete the spreading operation, regulated to the surface of the ground whether the same be rough or smooth.

In the drawing—

A is an axle;

B B, the wheels, in which the axle is mounted; and

C C, the thills, by which the axle and wheels are drawn.

Bars *a a* project backward from the axle near each end of the same.

To the rear ends of the bars *a* are jointed vertical standards.

A horizontal bar, *c*, is secured upon the tops of the standards, through holes made in which bar the fork-handles *d* all pass, so that the bar constitutes the fulcrum or controller of the fork-handle.

The crank-shaft, upon which the fork-handles are all mounted, is shown at *e*.

In the foregoing arrangement there is nothing new.

In fig. 2, *f* is a standard, projecting downward from the middle of the bar *c*.

The standard *f* is jointed, at its lower end, to the rear extremity of a bar, *h*, which, rigidly attached to the axle A, projects to both the rear and front of the same.

At its forward extremity the bar *h* is provided with a vertical rack, *i*.

To the cross-bar *k*, of the thills, is attached one end of a spring, *l*, which engages with the teeth of the rack *i*, and thus keeps steady the bar *h* and the spreading apparatus.

The spring *l* rises to within convenient reach of the driver, as he sits in his seat D, so that he may at any time easily disengage the spring from the rack *i*.

When this is done, the spreading apparatus, on the rear end of the bar *h*, falls to the ground by its own weight, throwing upward the front end of the bar *h*.

The driver is consequently enabled, by pressing the bar downward with his foot, to raise the spreading apparatus high enough to clear any irregularities in the surface of the ground, and to make it follow the surface by regulating the pressure.

To the under side of each thill is pivoted a sway-bar, *m*, which sway-bars are curved downward to near the ground, at their rear ends.

An arm, *n*, attached to the front end of each sway-bar is bent upward and inward, as shown in figs. 1 and 2.

To the upper extremity of each arm *n* is jointed the forward extremity of a connecting-rod, *o*, on whose rear extremity is formed an eccentric strap, *r*, fig. 2.

The straps *r* inclose eccentrics *s*, on the crank-shaft *e*.

By the eccentrics *s* a vibratory motion is imparted to the arms *n* and sway-bars *m*. As the sway-bars precede the forks, they begin the spreading operation, throwing the grass in the swaths alternately from one side to the other.

The standards being all pivoted upon the crank-shaft *e*, it is evident that the bar *c* may be moved backward or forward. When it is moved backward, it changes the fulcrums of the fork-handles so as to cause them to strike well forward, and sweep along the surface of the ground. This should be the movement of the forks when the grass is thin. But when the grass is heavy, it needs to be tossed well upward from the earth, so as to separate its stalks one from another, and cause it to lie up light. The forks are made to strike upward, in order to effect this object, by moving the bar *c* forward.

Curved arms *t*, figs. 1 and 2, fixed at their lower ends in the bars *a*, project upward over the bar *c*, a series of transverse orifices being formed in each one of them, into which pins *u*, near each end of the bar *c*, enter, thus locking the bar. When the position of the bar is to be changed, the free ends of the curved arms *t* are swung outward, away from the pins *u*.

The crank-shaft *e* passes, at each end, through curved arms *v*, which bend under the hubs of the wheels B, and, at their lower and forward extremities, are jointed to the ends of arms *w*, which project downward from a shaft, *x*, that is mounted parallel with the axle in the bars *a*.

A handle, *j*, projects upward from the shaft *x* to within convenient proximity of the driver's seat.

Pinions, *q*, are mounted in the arms *v*, and gear with toothed annular concentric rims $p$, fixed on the inner sides of the wheels B.

The pinions $q$ gear with pinions $y$, fixed on the ends of the shaft $e$. Motion is thus communicated from the rims $p$ to the crank-shaft. The pinions $q$ are thrown out of gear, thus rendering the crank-shaft inoperative, by throwing the handle $j$ forward.

A plate, $z$, with notches in its edge, is fastened to the side of the driver's seat, for the purpose of securing the handle $j$ in any desired position.

Having thus described my invention,

What I claim as new, and desire to secure by Letters Patent, is—

1. The sway-bar $m$ $n$, in combination with connecting-rod $o$, eccentric $s$, and shaft $e$, as specified.
2. The rack $i$, spring $l$, shaft $e$, fork-handles $d$, and bars $c$ and $h$, all combined and arranged as described.
3. The shaft $e$, arm $v$, rim $p$, pinions $y$ $q$, shaft $x$, arms $w$, and handles $j$, all combined and arranged as explained.

MOSES B. HARVEY.

Witnesses:
SOLON C. KEMON,
D. OURAND.